United States Patent [19]

Daimon et al.

[11] Patent Number: 4,752,526
[45] Date of Patent: Jun. 21, 1988

[54] HEAT RESISTANCE-IMPROVED METAL-POLYPROPYLENE LAMINATE COMPOSITE

[75] Inventors: Takashi Daimon; Hideshi Sakamoto; Tatsuya Adachi, all of Ichiharashi, Japan

[73] Assignee: Chisso Corporation, Osaka, Japan

[21] Appl. No.: 25,054

[22] Filed: Mar. 12, 1987

[30] Foreign Application Priority Data

Mar. 22, 1986 [JP] Japan .................................. 61-64408
Mar. 24, 1986 [JP] Japan .................................. 61-65287

[51] Int. Cl.⁴ ....................... B32B 15/08; B32B 15/10; B32B 15/12
[52] U.S. Cl. .................................... 428/332; 428/337; 428/458; 428/461; 428/464
[58] Field of Search ............... 428/461, 464, 458, 332, 428/337

[56] References Cited

U.S. PATENT DOCUMENTS 4,513,049 4/1985 Yamasaki et al. .................. 428/194

FOREIGN PATENT DOCUMENTS 17-10757 6/1942 Japan .
58-91715 5/1983 Japan .

Primary Examiner—Thomas J. Herbert
Attorney, Agent, or Firm—Fred Philpitt

[57] ABSTRACT

A metal-polypropylene laminate composite comprising a polypropylene sheet made of a blend of a modified polypropylene prepared by modifying a crystalline polypropylene with an unsaturated carboxylic acid or its derivatives or a crystalline polypropylene containing such a modified polypropylene, with 15 to 50 wt. % of waste paper, organic fibers or wood pulp and metal plates superposed on and bonded by hot forming to both the surfaces of said polypropylene sheet is provided.

It is of light weight and useful in acoustically sound absorption, vibration damping and heat insulation purpose.

20 Claims, No Drawings

HEAT RESISTANCE-IMPROVED METAL-POLYPROPYLENE LAMINATE COMPOSITE

BACKGROUND OF THE INVENTION

1. Field of the Invention

The present invention relates to a laminate composite comprising a polypropylene sheet (hereinafter referred to as a "core material") made of a modified polypropylene prepared by modifying a crystalline polypropylene with an unsaturated carboxylic acid or a derivative of an unsaturated carboxylic acid and filled with waste paper, an organic fiber or wood pulp at a high concentration or a crystalline polypropylene containing such a modified polypropylene and filled with waste paper, an organic fiber or wood pulp at a high concentration, and metal plates.

Laminate composites made of metal plates and a plastic sheet as the core material in combination have recently been developed from the viewpoint of weight reduction of a metal plate, and acoustically sound absorbing property, vibration damping and heat insulating properties, and widely used in the fields of public works, construction, automobiles and household appliances.

2. Prior Art

A laminate composite using a polypropylene resin as the core material is also partially put into practical use. However, since the resin melts and flows out of a punching portion of a part formed from the composite to cover the punching portion when the part is baked in coating of the part (usually heat-treated at about 180° to 200° C. for 30 min.), troubles are encountered in post-forming. Further, since the resin is shrunken to a large extent in the course of cooling and solidification, particularly the vicinity of shearing work portion is disadvantageously deformed. Thus, the fact is that the above-mentioned laminate composite cannot be used in parts to be subjected to a step of baking finish. With a view to solving the above-mentioned problems concerning the metal-polypropylene laminate composite, the inventors of the present invention previously proposed a laminate composite comprising a sheet made of a blend of a crystalline polypropylene with a specific amount of waste paper or an organic fiber, and metal plates heat- and contact-bonded through modified polypropylene layers to both surfaces of the sheet. Since the heat resistance of the modified polypropylene layers is still insufficient, however, the modified polypropylene layers are softened in baking finish to lower the adhesion thereof to the surfaces of the metal plates, leading to a phenomenon that the vicinity of a cut portion of the composite is partially peeled. Therefore, edge turning or the like of the cut portion is needed in the use of the composite. Thus, the composite is still unsatisfactory in developing the fields of application thereof.

The inventor of the present invention have further made intensive investigations with a view to preventing peeling between the modified polypropylene and the metal surface in high temperature treatment. As a result, they have found that the use as the core material of a polypropylene sheet made of a blend of a modified polypropylene prepared by modifying a crystalline polypropylene with an unsaturated carboxylic acid or its derivative or a crystalline polypropylene containing such a modified polypropylene with a specific amount of waste paper, an organic fiber or wood pulp can provide a metal-polypropylene laminate composite which has an adhesion enough to resist post-forming such as bending, punching, cutting, deep draw forming, etc., and which is free from flowing and dropping out of the molten resin from the cut or punching portion, heat distortion thereof in the vicinity of the cut or punching portion, and peeling in the interface between the resin and the metal even in the course of baking finish. The present invention has been completed based on such a finding.

As is apparent from the above description, an object of the present invention is to provide a highly heat-resistant metal-polypropylene laminate composite which has a high adhesion between the metal and the resin as the core material, and which is free from flowing and dropping out of the molten resin from the cut portion, heat distortion in the vicinity of the cut portion, and peeling between the metal and the core material.

SUMMARY OF THE INVENTION

In accordance with the present invention, there is provided a metal-polypropylene laminate composite comprising a polypropylene sheet made of a blend of a modified polypropylene prepared by modifying a crystalline polypropylene with an unsaturated carboxylic acid or its derivative or a crystalline polypropylene containing such a modified polypropylene with 15 to 50 wt. % of waste paper, an organic fiber or wood pulp, and metal plates superposed on and heat- and contact-bonded to both the surfaces of the polypropylene sheet.

DETAILED DESCRIPTION OF THE INVENTION

The modified polypropylene to be used in the present invention is prepared by modifying a crystalline polypropylene as mentioned later with an unsaturated carboxylic acid or its derivative.

Examples of the unsaturated carboxylic acid that may be used in preparation of the modified polypropylene include acrylic acid, methacrylic acid, fumaric acid, maleic acid, itaconic acid, and citraconic acid. Examples of derivatives of the unsaturated carboxylic acid include acid anhydrides, esters, amides, imides, metal salts.

Specific examples of the derivatives includes maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid N-monoethylamide, maleic acid N,N-diethylamide, maleimide, N-butylmaleimide, N-phenylmaleimide, sodium acrylate, sodium methacrylate, and potassium acrylate. Among them, maleic anhydride is preferably used. Known various modification methods can be employed. For example, a crystalline polypropylene and an unsaturated carboxylic acid or its derivative are molten and kneaded in the presence of an organic peroxide at a temperature above the melting point of the crystalline polypropylene.

The amount of the unsaturated carboxylic acid or its derivative to be used is preferably 0.01 to 5 wt. %, more preferably 0.05 to 3 wt. % bawed upon the raw material of crystalline polypropylene.

A mixture of an unmodified crystalline polypropylene with 5 wt. % or more of the modified polypropylene may be used as the crystalline polypropylene containing a modified polypropylene according to the present invention. It is generally preferred to use by mixing a modified polypropylene which is prepared by using 0.1 to 10 wt. % of an unsaturated carboxylic acid or its derivative with the unmodified crystalline polypropylene at a ratio as mentioned above.

As the crystalline polypropylene to be used for the preparation of the modified polypropylene and the crystalline polypropylene to be mixed with the modified polypropylene, there can be mentioned a propylene homopolymer, propylene-ethylene block copolymers and random copolymers, propylene-ethylene-butene-1block copolymers and random copolymers, propylene-butene-1 random copolymers, and mixtures thereof. In these copolymers, the amount of the propylene component is at least 70 wt. %. The crystalline polypropylene used for the preparation of a modified polypropylene and the crystalline polypropylene mixed with the above-mentioned modified polypropylene may be of the same kind or of different kinds. The melt flow rate of the crystalline polypropylene is preferably about 0.1 to 20 g/10 min, more preferably 0.5 to 10 g/10 min. Other polyolefin such as ethylene-propylene rubber, ethylene-propylene-diene rubber, or poly-4-methylpentene, ethylene-vinyl acetate copolymer may be mixed with the modified polypropylene or the crystalline polypropylene containing the modified polypropylene to be used in the present invention in so far as the effects of the present invention are not adversely affected.

As the waste paper that may be used in the present invention, there can be mentioned newspaper, corrugated paper, cardboard and a scrap material of cardboard and mixtures thereof. However, any kind of paper can be used without any particular limitation. Inexpensive ones available in a large amount are preferred. The waste paper is usually used after cutting or rough crushing to a length of preferably 30 mm or less, more preferably about 5 mm or less.

The kind of organic fiber that may be used in the present invention is not particularly limited in so far as it is neither decomposed nor molten under the temperature conditions of not only melting, kneading and extruding the polypropylene composition blended with the organic fiber to form a sheet, but also molding the sheet. Examples of such an organic fiber include a polyamide fiber, a polyimide fiber, a polyester fiber, a polyvinyl alcohol fiber, a polyvinylidene chloride fiber, a polyacrylonitrile fiber, a polyurethane fiber, a polyalkylene paraoxybenzoate fiber, a phenol type fiber, a rayon fiber, a cellulose acetate fiber, a flax fiber, cotton fiber, a ramie fiber, a jute fiber, a wool fiber, a silk fiber, and mixtures thereof.

The form of the organic fiber is not particularly limited, and may be yarns, woven or knitted fabrics, or non-woven fabrics. In the case of woven or knitted fabrics or non-woven fabrics, it is preferable to fray them into individual filaments before use thereof.

The organic fiber is preferably cut to a length of 0.5 to 50 mm, particularly preferably 1 to 30 mm, before use thereof. The fineness of the organic fiber is preferably within a range of 0.5 to 20 denier, particularly 1 to 10 denier.

The wood pulp that may be used in the present invention may be chemical pulp, mechanical pulp, or the like. Mechanical pulp is preferred. A wood pulp having a fiber length of 5 mm or less, preferably about 3 mm is preferably used.

The amount of waste paper, organic fiber, or wood pulp to be blended with the modified polypropylene or the crystalline polypropylene containing the modified polypropylene is preferably 15 to 50 wt. %, particularly preferably 20 to 40 wt. %. When the amount of waste paper, organic fiber or wood pulp exceeds 50 wt. %, the flowability of the molten resin is drastically lowered, leading to a difficulty in molding, and the resulting laminate composite is disadvantageously poor in adhesion of the resin to metal plates. When it is less than 15 wt. %, flowing out of the molten resin from the cut or punching portion and liability to peeling in the interface between the resin as the core material and metal plates are disadvantageously observed in the baking finish.

The polypropylene sheet to be used as the core material in the present invention may include a heat resistance-improving stabilizer, a weathering stabilizer, a lubricant, a slip agent, a fire retardant, an antistatic agent, a nucleating agent, an inorganic filler, etc., in so far as the function of the sheet is not adversely affected.

The polypropylene sheet to be used as the core material in the present invention is formed by a known method. The thickness of the sheet is desired to be 0.1 to 5 mm, preferably 0.2 to 2 mm.

As the metal plate to be used in the present invention, there can be mentioned plates of metals such as iron, steel, aluminum, copper, zinc, nickel, titanium, and alloys containing one or more kinds of metals as mentioned above as the main components. The thickness of the metal plate is 0.05 to 2.0 mm, preferably 0.15 to 1.0 mm. The metal plate is usually used after the bonding surface thereof is subjected to a surface treatment such as a degreasing treatment or a sandblast treatment. It may be further subjected to a primer treatment such as an epoxy resin coating treatment.

The laminate composite of the present invention can be obtained by superposing metal plates having a bonding surface subjected to a surface treatment on both the surfaces of a polypropylene sheet as mentioned before, followed by heat- and contact-bonding with a compression press or hot rolls. The heating temperature in heat- and contact-bonding is preferably 160° to 220° C., while the pressure is preferably 1 to 50 Kg/cm$^2$G. Under such conditions, contact bonding is preferably effected for 0.1 sec to 10 min.

EFFECT OF THE INVENTION

The laminate composite of the present invention is free from peeling in post-forming such as cutting, punching, bending, deep draw forming, as well as flowing or dropping out of the molten resin from the cut or punching portion, and which undergoes little heat distortion. Further, no peeling between the metal plates and the core material in the cut portion is observed. Accordingly, it can be suitably used as internal and external panels, various panels of household and domestic electrical appliances, panels for construction, etc. in various fields.

EXAMPLES

The following Examples and Comparative Examples will now illustrate the present invention in detail, but should not be construed as limiting the scope of the invention.

EXAMPLES 1 TO 3 AND COMPARATIVE EXAMPLES 1 TO 5

A polypropylene composed of 25 wt. % of a modified polypropylene prepared by modifying a propylene-ethylene random copolymer having an ethylene unit content of 3.5 wt. % with 1.2 wt. % of maleic anhydride in the presence of 0.10 wt. % of 1,3-bis(t-butylperoxyisopropyl)benzene as a radical initiator, 60 wt. % of an unmodified crystalline propylene homopolymer, and 15 wt. % of an ethylene-propylene rubber was placed in a Henschel Mixer (trade name) together with a filler consisting of waste paper cut into pieces of 5 mm in both the longitudianl and lateral directions at a ratio as shown in Table 1 given later. They were mixed by stirring for 3 min. The resulting mixture was extruded into a sheet having a thickness of 0.4 mm by an extruder equipped with a T die having an opening diameter of 65 mm at a resin temperature of 210° C.

In Comparative Examples 1 to 5, the same polypropylene as used in Examples 1 to 3 was blended with each of various fillers at a ratio as shown in Table 1 given later. They were mixed by stirring and extruded in the same manner as in Examples 1 to 3 to obtain a sheet having a thickness of 0.4 mm.

Cold rolled steel plates having a thickness of 0.27 mm and the surfaces thereof cleansed with trichloroethylene were prepared as the metal plates.

The above-mentioned sheet was sandwiched between two steel plates, and contact-bonded at 200° C. under a pressure of 20 Kg/cm$^2$G for 1 min to obtain a laminate composite.

The T-peel strength and state after a heat treatment of the laminate composite were examined. The results are shown in Table 1. The measurement of T-peel strength was carried out in accordance with JIS K 6854 at a pulling rate of 200 mm/min.

The heat treatment was carried out as follows. A test specimen prepared by cutting the laminate composite to a length of 20 cm and a width of 10 cm and making a hole of 20 mm in diameter in the center of the resulting rectangle was hung in a heating oven maintained at 200° C. for 30 min.

As is apparent from Table 1, laminate composites of the present invention wherein the core material was blended with waste paper at a specific ratio had a high peel strength, were free from flowing out of the cut portion of the molten resin, and underwent very little deformation of the cut portion. Further, no peeling between the metal plates and the resin layer in the cut portion was observed. The laminate composite kept the same form thereof as before the heat treatment.

COMPARATIVE EXAMPLE 6

25 wt. % of a modified polypropylene prepared by modifying a propylene-ethylene random copolymer having an ethylene unit content of 2.5 wt. % with 0.8 wt. % of maleic anhydride in the presence of 0.05 wt. % of 1,3-bis(t-butylperoxyisopropyl)benzene as a radical initiator, 63 wt. % of a propylene-ethylene block copolymer having an ethylene unit content of 8.5%, and 12 wt. % of an ethylene-propylene rubber were mixed by stirring in a Henschel Mixer (trade name) for 3 min. The resulting mixture was extruded into a modified polypropylene film having a thickness of 40µ by an extruder equipped with a T die having an opening diameter of 40 mm at a resin temperature of 200° C.

A crystalline propylene homopolymer and 30 wt. % of a filler consisting of waste paper cut into pieces of 5 mm in both the longitudinal and lateral directions were placed in a Henschel Mixer (trade name) and mixed by stirring for 3 min. The resulting mixture was extruded into a polypropylene type sheet having a thickness of 0.32 mm by an extruder equipped with a T die having an opening diameter of 65 mm at a resin temperature of 210° C.

The same metal plates as used in Examples 1 to 3 were prepared.

A laminate composite of steel plate-modified polypropylene film/polypropylene type sheet/modified polypropylene film/steel plate superposed in this order was prepared by contact-bonding at 200° C. under a pressure of 20 Kg/cm$^2$G for 1 min. The T-peel strength and state after a heat treatment of the laminate composite were examined in the same manner as in Examples 1 to 3. Although the T-peel strength was as high as 20.8 Kg/25 mm and flowing out of the resin was not observed after the heat treatment, peeling between the metal plates and the bonding layers was confirmed in part of the cut portion.

TABLE 1

| | Filler | | Melt Flow Rate of Composition [g/10 min] | T-Peel Strength [Kg/25 mm] | State after Heat Treatment | | |
|---|---|---|---|---|---|---|---|
| | Kind | Amount [weight/%] | | | Flowing out of Resin | Deformation in cut Portion | Peeling in cut Portion |
| Ex. 1 | waste paper | 20 | 1.7 | 22.8 | not observed | hardly observed | not observed |
| Ex. 2 | waste paper | 30 | 0.98 | 21.2 | not observed | hardly observed | not observed |
| Ex. 3 | waste paper | 40 | 1.2 | 19.8 | not observed | hardly observed | not observed |
| Com. Ex. 1 | — | — | 0.94 | 25.7 | observed | observed | observed |
| Com. Ex. 2 | waste paper | 10 | 0.96 | 24.6 | partially observed | slightly observed | slightly observed |
| Com. Ex. 3 | ground limestone | 30 | 1.5 | 26.2 | observed | observed | observed |
| Com. Ex. 4 | Talc | 30 | 1.1 | 14.2 | " | " | " |
| Com. Ex. 5 | glass fiber | 30 | 0.86 | 15.0 | " | " | " |

EXAMPLES 4 TO 7 AND COMPARATIVE EXAMPLES 7 to 11

A polypropylene composed of 25 wt. % of a modified polypropylene prepared by modifying a propylene-ethylene random copolymer having an ethylene unit content of 3.5 wt. % with 1.2 wt. % of maleic anhydride in the presence of 0.10 wt. % of 1,3-bis(t-butylperoxyisopropyl)benzene as a radical initiator, 60 wt. % of an unmodified crystalline propylene homopolymer, and 15 wt. % of an ethylene-propylene rubber was placed in a Henschel Mixer (trade name) together with a filler consisting of each of various organic fibers having a fineness of 1 denier and a length of 3 mm at a ratio as shown in Table 2 given later. They were mixed with stirring for 3 min. The resulting mixture was extruded into a sheet having a thickness of 0.4 mm by an extruder equipped with a T die having an opening diameter of 65 mm at a resin temperature of 210° C.

In Comparative Examples 7 to 11, the same polypropylene as used in Examples 4 to 7 was blended with each of various fillers at a ratio as shown in Table 2 given later. They were mixed with stirring and extruded in the same manner as in Examples 4 to 7 to obtain a sheet having a thickness of 0.4 mm.

Cold rolled steel plates having a thickness of 0.27 mm and the surfaces thereof cleansed with trichloroethylene were prepared as the metal plates.

The above-mentioned sheet was sandwiched between two steel plates, and contact-bonded at 200° C. under a pressure of 20 Kg/cm²G for 1 min to obtain a laminate composite.

The T-peel strength and state after a heat treatment of the laminate composite were examined. The results are shown in Table 2. The measurement of T-peel strength was carried out in accordance with JIS K 6854 at a pulling rate of 200 mm/min.

The heat treatment was carried out as follows. A test specimen prepared by cutting the laminate composite to a length of 20 cm and a width of 10 cm and making a hole of 20 mm in diameter in the center of the resulting rectangle was hung in a heating oven maintained at 200° C. for 30 min.

As is apparent from Table 2, laminate composites of the present invention wherein the core material was blended with an organic fiber at a specific ratio had a high peel strength, were free from flowing out of the molten resin from the cut portion, and underwent very little deformation of the cut portion. Further, no peeling between the metal plates and the resin layer in the cut portion was observed. The laminate composite kept the same form thereof as before the heat treatment.

COMPARATIVE EXAMPLE 12

25 wt. % of a modified polypropylene prepared by modifying a propylene-ethylene random copolymer having an ethylene unit content of 2.5 wt. % with 0.8 wt. % of maleic anhydride in the presence of 0.05 wt. % of 1,3-bis(t-butylperoxyisopropyl)benzene as a radical initiator, 63 wt. % of a propylene-ethylene block copolymer having an ethylene unit content of 8.5 wt. %, and 12 wt. % of an ethylene-propylene rubber were mixed by stirring in a Henschel Mixer (trade name) for 3 min. The resulting mixture was extruded into a modified polypropylene film having a thickness of 40μ by an extruder equipped with a T die having an opening diameter of 40 mm at a resin temperature of 200° C.

A crystalline propylene homopolymer and 30 wt. % of a filler consisting of an organic fiber having a fineness of 1 denier and length of 3 mm and composed of 35 wt. % of a cotton fiber and 65 wt. % of polyester fiber were placed in a Henschel Mixer (trade name) and mixed with stirring for 3 min. The resulting mixture was extruded into a polypropylene type sheet having a thickness of 0.32 mm by an extruder equipped with a T die having an opening diameter of 65 mm at a resin temperature of 210° C.

The same metal plates as used in Examples 4 to 7 were prepared.

A laminate composite of steel plate/modified polypropylene film/polypropylene type sheet/modified polypropylene film/steel plate superposed in this order was prepared by contact-bonding at 200° C. under a pressure of 20 Kg/cm²G for 1 min. The T-peel strength and state after a heat treatment of the laminate composite were examined in the same manner as in Examples 4 to 7. Although the T-peel strength was as high as 20.2 Kg/25 mm and flowing out of the resin was not observed after the heat treatment, peeling between the metal plates and the bonding layers was confirmed in part of the cut portion.

TABLE 2

| | Filler | | Melt Flow rate of composition [g/10 min] | T-Peel strength [Kg/25 mm] | State after Heat Treatment | | |
|---|---|---|---|---|---|---|---|
| | Kind | Amount [wt. %] | | | Flowing out of Resin | Deformation in Cut Portion | Peeling in Cut Portion |
| Ex. 4 | mixture of 65% polyester fiber and 35% cotton fiber | 20 | 1.8 | 21.1 | not observed | hardly observed | not observed |
| Ex. 5 | mixture of 65% polyester fiber and 35% cotton fiber | 40 | 0.82 | 17.9 | not observed | hardly observed | not observed |
| Ex. 6 | mixture of 75% polyacrilo-nitrile and 25% cotton fiber | 30 | 1.5 | 19.7 | not observed | hardly observed | not observed |
| Ex. 7 | 100% polyester fiber | 30 | 1.1 | 20.5 | not observed | hardly observed | not observed |
| Com. Ex. 7 | — | — | 0.94 | 25.7 | observed | observed | observed |
| Ex. 8 | mixture of 65% polyester fiber and 35% cotton | 10 | 1.2 | 23.1 | partially observed | slightly observed | slightly observed |

TABLE 2-continued

|  | Filler | | Melt Flow rate of composition [g/10 min] | T-Peel strength [Kg/25 mm] | State after Heat Treatment | | |
|---|---|---|---|---|---|---|---|
|  | Kind | Amount [wt. %] |  |  | Flowing out of Resin | Deformation in Cut Portion | Peeling in Cut Portion |
| Ex. 9 | fiber ground limestone | 30 | 1.5 | 26.2 | observed | observed | observed |
| Ex. 10 | Talc | 30 | 1.1 | 14.2 | observed | observed | observed |
| Ex. 11 | glass fiber | 30 | 0.86 | 15.0 | observed | observed | observed |

EXAMPLES 8 TO 10 AND COMPARATIVE EXAMPLES 13 to 17

A polypropylene composed of 25 wt. % of a modified polypropylene prepared by modifying a propylene-ethylene random copolymer having an ethylene unit content of 3.5 wt. % with 1.2 wt. % of maleic anhydride in the presence of 0.10 wt. % of 1,3-bis(t-butylperoxyisopropyl)benzene as a radical initiator, 60 wt. % of an unmodified crystalline propylene homopolymer, and 15 wt. % of an ethylene-propylene rubber was placed in a Henschel Mixer (trade name) together with a filler consisting of mechanical pulp having a fiber length of about 3 mm at a ratio as shown in Table 3 given later. They were mixed with stirring for 3 min. The resulting mixture was extruded into a sheet having a thickness of 0.4 mm by an extruder equipped with a T die having an opening diameter of 65 mm at a resin temperature of 210° C.

In Comparative Examples 13 to 17, the same polypropylene as used in Examples 8 to 10 was blended with each of various fillers at a ratio as shown in Table 3 given later. They were mixed with stirring and extruded in the same manner as in Examples 8 to 10 to obtain a sheet having a thickness of 0.4 mm.

Cold rolled steel plates having a thickness of 0.27 mm and surfaces cleansed with trichloroethylene were prepared as the metal plates.

The above-mentioned sheet was sandwiched between two steel plates, and contact-bonded at 200° C. under a pressure of 20 Kg/cm²G for 1 min to obtain a laminate composite.

The T-peel strength and state after a heat treatment of the laminate composite were examined. The results are shown in Table 3. The measurement of T-peel strength was carried out in accordance with JIS K 6854 at a pulling rate of 200 mm/min.

The heat treatment was carried out as follows. A test specimen prepared by cutting the laminate composite to a length of 20 cm and a width of 10 cm and making a hole of 20 mm in diameter in the center of the resulting rectangle was hung in a heating oven maintained at 200° C. for 30 min.

As is apparent from Table 3, laminate composites of the present invention wherein the core material was blended with mechanical pulp at a specific ratio had a high peel strength, were free from flowing out of the molten resin from the cut portion, and underwent very little deformation of the cut portion. Further, no peeling between the metal plates and the resin layer in the cut portion was observed. The laminate composite kept the same form thereof as before the heat treatment.

COMPARATIVE EXAMPLE 18

25 wt. % of a modified polypropylene prepared by modifying a propylene-ethylene random copolymer having an ethylene unit content of 2.5 wt. % with 0.8 wt. % of maleic anhydride in the presence of 0.05 wt. % of 1,3-bis(t-butylperoxyisopropyl)benzene as a radical initiator, 63 wt. % of a propylene-ethylene block copolymer having an ethylene unit content of 8.5%, and 12 wt. % of an ethylene-propylene rubber were mixed with stirring in a Henschel Mixer (trade name) for 3 min. The resulting mixture was extruded into a modified polypropylene film having a thickness of 40μ by an extruder equipped with a T die having an opening diameter of 40 mm at a resin temperature of 200° C.

A crystalline propylene homopolymer and 30 wt. % of a filler consisting of mechanical pulp having a fiber length of about 3 mm were placed in a Henschel Mixer (trade name) and mixed by stirring for 3 min. The resulting mixture was extruded into a polypropylene type sheet having a thickness of 0.32 mm by an extruder equipped with a T die having an opening diameter of 65 mm at a resin temperature of 210° C.

The same metal plates as used in Examples 8 to 10 were prepared.

A laminate composite of steel plate/modified polypropylene film/polypropylene type sheet/modified polypropylene film/steel plate superposed in this order was prepared by contact-bonding at 200° C. under a pressure of 20 Kg/cm²G for 1 min. The T-peel strength and state after a heat treatment of the laminate composite were examined in the same manner as in Examples 8 to 10. Although the T-peel strength was as high as 19.5 Kg/25 mm and flowing out of the resin was not observed after the heat treatment, peeling between the metal plates and the bonding layers was confirmed in part of the cut portion.

TABLE 3

|  | Filler | | Melt Flow Rate of composition [g/10 min] | T-Peel strength [Kg/25 mm] | State after Heat Treatment | | |
|---|---|---|---|---|---|---|---|
|  | Kind | Amount [wt. %] |  |  | Flowing out of Resin | Deformation in Cut Portion | Peeling in Cut Portion |
| Ex. 8 | mechanical pulp | 20 | 1.6 | 23.1 | not observed | hardly observed | not observed |
| Ex. 9 | mechanical pulp | 30 | 1.2 | 21.5 | not observed | hardly observed | not observed |
| Ex. 10 | mechanical pulp | 40 | 0.92 | 20.0 | not observed | hardly observed | not observed |

TABLE 3-continued

|  | Filler | Melt Flow Rate of composition [g/10 min] | T-Peel strength [Kg/25 mm] | State after Heat Treatment | | |
|---|---|---|---|---|---|---|
|  | Kind | Amount [wt. %] |  |  | Flowing out of Resin | Deformation in Cut Portion | Peeling in Cut Portion |
| Com. Ex. 13 | — | — | 0.94 | 25.7 | observed | observed | observed |
| Ex. 14 | mechanical pulp | 10 | 0.85 | 25.1 | partially observed | hardly observed | hardly observed |
| Ex. 15 | ground limestone | 30 | 1.5 | 26.2 | observed | observed | observed |
| Ex. 16 | Talc | 30 | 1.1 | 14.2 | observed | observed | observed |
| Ex. 17 | glass fiber | 30 | 0.86 | 15.0 | observed | observed | observed |

What is claimed is:

1. A metal-polypropylene laminate composite comprising in combination
   (1) a sheet comprising a blend of
      (a) a crystalline polypropylene that has been modified with an unsaturated carboxylic acid or its derivative, or an unmodified crystalline polypropylene containing such a modified polypropylene, with
      (b) 15 to 50 wt % of waste paper, or an organic fiber or wood pulp, and
   (2) metal plates superposed on and heat- or contact-bonded to both surfaces of said sheet.

2. A composite according to claim 1 wherein the thickness of said plates is 0.05-2 mm.

3. A composite according to claim 1 wherein the thickness of said sheet is 0.1 to 5 mm.

4. A metal-polypropylene laminate composite as claimed in claim 1, wherein said crystalline polypropylene is a member selected from the group consisting of a propylene homopolymer, propylene-ethylene block copolymers and propylene-ethylene random copolymers having a propylene unit content of 70 wt. % or more, propylene-ethylene-butene-1 block copolymers and random copolymers having a propylene unit content of 70 wt. % or more, propylene-butene-1 random copolymers having a propylene unit content of 70 wt. % or more, and mixtures thereof.

5. A metal-polypropylene laminate composite as claimed in claim 1, wherein said unsaturated carboxylic acid or its derivative is a member selected from the group consisting of acrylic acid, methacrylic acid, fumaric acid, maleic acid, itaconic acid, citraconic acid, maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monoethyl itaconate, diethyl itaconate, acrylamide, methacrylamide, maleic acid monoamide, maleic acid diamide, maleic acid N-monoethylamide, maleic acid N,N-diethylamide, maleimide, N-butylmaleimide, N-phenylmaleimide, sodium acrylate, sodium methacrylate, and potassium acrylate.

6. A metal-polypropylene laminate composite as claimed in claim 1, wherein said waste paper is a member selected from the group consisting of newspaper, corrugated paper, cardboard, and mixtures thereof.

7. A metal-polypropylene laminate composite as claimed in claim 1, wherein said organic fiber is a member selected from the group consisting of a polyamide fiber a polyimide fiber, a polyester fiber, a polyvinyl alcohol fiber, a polyvinylidene chloride fiber, a polyacrylonitrile fiber, a polyurethane fiber, a polyalkylene paraoxybenzoate fiber, a phenol type fiber, a rayon fiber, cellulose acetate fiber, cotton fiber, flax fiber, a ramie fiber, a jute fiber, a wool fiber, a silk fiber, and mixtures thereof.

8. A metal-polypropylene laminate composite as claimed in claim 1, wherein said wood pulp is mechanical pulp.

9. A composite according to claim 1 wherein (a) consists of a mixture of an unmodified crystalline polypropylene and 5% of more of said modified polypropylene.

10. A composite according to claim 1 wherein the amount of the unsaturated carboxylic acid or its derivative in (a) is 0.01 to 5 wt %.

11. A composite according to claim 10 wherein (a) consists of a mixture of an unmodified crystalline polypropylene and 5% of more of said modified polypropylene.

12. A composite according to claim 1 wherein there is 20 to 40 wt % of waste paper, an organic fiber or wood pulp.

13. A metal-polypropylene laminate composite as claimed in claim 12, wherein said crystalline polypropylene is a member having a propylene unit content of 70 wt. % or more, selected from the group consisting of a propylene homopolymer, propylene-ethylene block copolymers and propylene-ethylene random copolymers, propylene-ethylene-butene-1 block copolymers and propylene-ethylene-butene-1 random copolymers, and mixtures thereof.

14. A metal-polypropylene laminate composite as claimed in claim 12, wherein said unsaturated carboxylic acid or its derivative is a member selected from the group consisting of acrylic acid, methacrylic acid, maleic acid, itaconic acid, maleic anhydride, methyl acrylate, methyl methacrylate, ethyl acrylate, and ethyl methacrylate.

15. A metal-polypropylene laminate composite as claimed in claim 12, wherein said waste paper is a member selected from the group consisting of newspaper, corrugated paper, cardboard, and mixtures thereof.

16. A metal-polypropylene laminate composite as claimed in claim 12, wherein said organic fiber is a member selected from the group consisting of a polyester fiber, a polyacrylonitrile fiber, a cotton fiber, and mixtures thereof.

17. A metal-polypropylene laminate composite as claimed in claim 12, wherein said wood pulp is mechanical pulp.

18. A composite according to claim 12 wherein the amount of the unsaturated carboxylic acid or its derivative in (a) is 0.01 to 5 wt %.

19. A composite according to claim 12 wherein the thickness of said sheet is 0.1 to 5 mm.

20. A composite according to claim 12 wherein the thickness of said plates is 0.05-2 mm.

* * * * *